March 6, 1934.   H. MEADOWS   1,949,753
COOLING SYSTEM FOR MOTOR VEHICLE ENGINES
Filed Aug. 1, 1931   2 Sheets-Sheet 2

INVENTOR
Harold Meadows.
his Attorney

Patented Mar. 6, 1934 1,949,753

UNITED STATES PATENT OFFICE 1,949,753

COOLING SYSTEM FOR MOTOR VEHICLE ENGINES

Harold Meadows, Cayuga, Ontario, Canada

Application August 1, 1931, Serial No. 554,585
In Canada August 1, 1930

2 Claims. (Cl. 123—174)

This present invention relates to certain new and useful improvements in a cooling system for a motor vehicle engine.

The primary object of the invention resides in the provision of a cooling system of simple and inexpensive design and increased efficiency.

The invention has for another object the provision of a cooling system of the character stated including a special condenser for the overflow from the radiator of the engine.

The invention has for a further object the provision of a cooling system for a motor vehicle engine in which a special condenser is included and arranged to receive the overflow from the motor vehicle engine radiator and thus cause condensation of the overflow and return of the same to the engine jacket.

The invention has for a further object the provision of a cooling system for a motor vehicle engine including a special condenser arranged in a particular manner across the engine hood to permit a free circulation of cool air around all of the coils of the condenser, at all times.

The invention has for a still further object the provision of a cooling system of the character stated in which the special condenser is supported on novel brackets and retained in an inclined plane over the engine hood or some other appropriate portion of the engine or motor vehicle structure.

The invention has for a still further object the provision of a cooling system of the character stated which may be readily incorporated in the structure of motor vehicles and the like now in general use or included in the construction of new motor vehicles and the like during design and manufacture thereof at small cost and without materially increasing the total cost of the motor vehicle, thereby providing a commercially attractive proposition.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1:
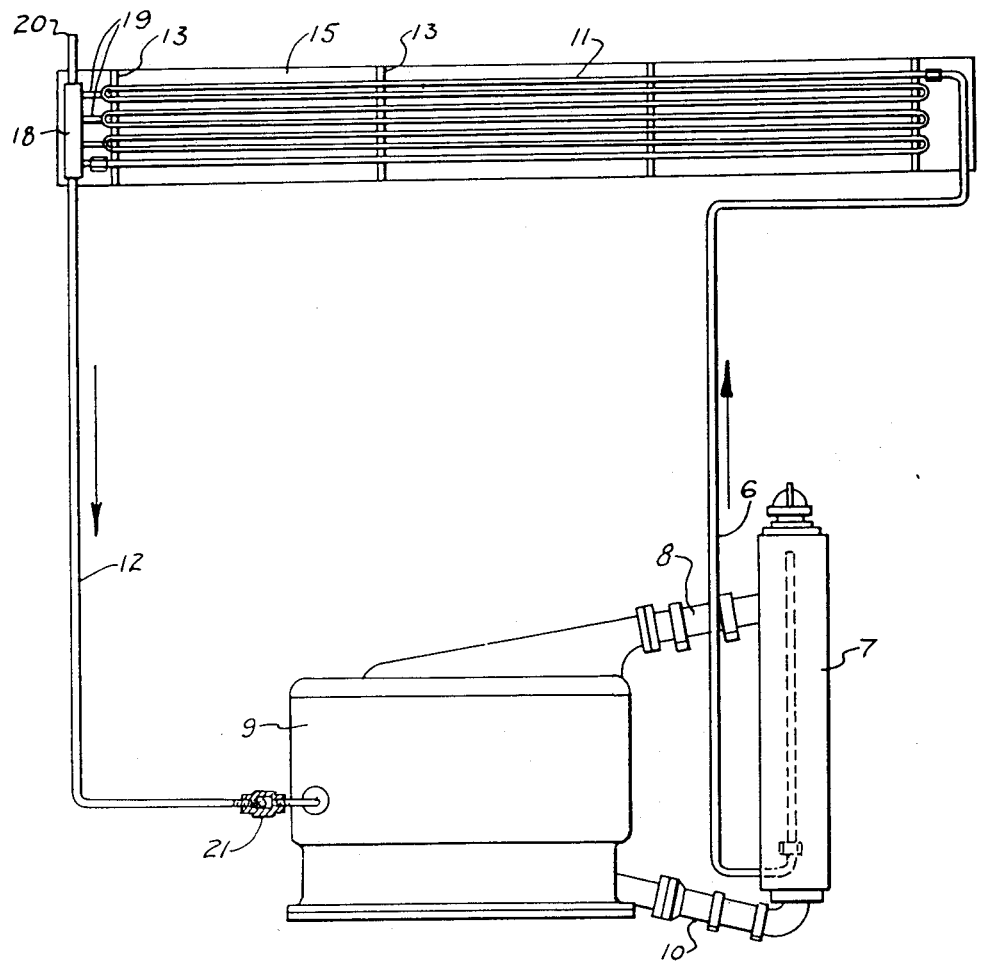
Figure 1 is a diagrammatic view of the improved cooling system for a motor vehicle engine with the special condenser included in the cooling system.
Figure 2:
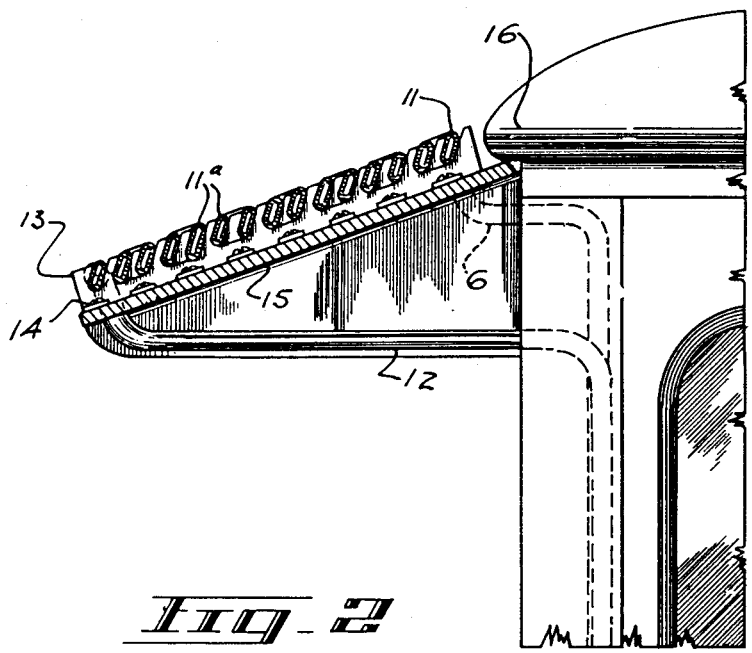
Figure 2 is a vertical transverse section through the condenser, showing the same mounted across the visor above the wind shield, a portion of the car body being shown in elevation.
Figure 3:
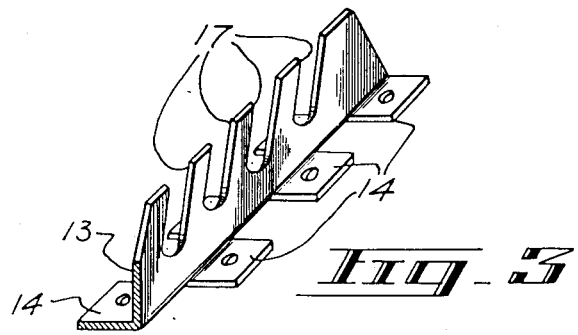
Figure 3 is a detailed perspective of one of the condenser supporting bracket plates.

Referring more in detail to the drawings, it is to be noted that a pipe 6 arises from the bottom of the engine radiator 7 near the usual return pipe 10 extending from the bottom of the radiator 7 to the engine jacket 9.

The pipe 6 extends upwardly and connects with the upper end of the special condenser 11 which is formed of a plurality of elongated longitudinal coils having opposite sides flattened and the coils tilted or inclined. An upstanding outlet chamber 18 is mounted on the other end of the condenser 11 and braced by spaced brace rods 19 extended laterally therefrom and connected with the ends of the condenser coils. Directed upwardly and rearwardly from the top of the outlet chamber 18, over the top of the motor vehicle, is the short, open vent tube 20. A return pipe 12 is extended from the bottom of the outlet chamber 18 to the engine jacket 9 and has a ball check valve 21 at its connection with said engine jacket 9 to allow liquid to pass only in the direction indicated by the arrow from the condenser 11 and prevent anti-freeze from being forced back into the condenser 11, by any momentary increase of the pressure in the engine jacket. The condenser 11 is supported in an inclined plane by a plurality of bracket plates 13 having lugs 14 turned in opposite directions from the lower edge thereof and suitably secured on the upper face of the visor 15 over the wind shield or on some other appropriate support exteriorly of the motor vehicle 16. The bracket plates 13 are arranged in spaced parallel relation on the visor 15 and have rearwardly inclined slots 17 provided in their upstanding edges to accommodate the flattened coils 11a of the condenser 11. It is apparent that this form of condenser 11 supported in the manner stated, provides for circulation of cool air around all of the coils 11a of the condenser 11, at all times, thus tending to cool and condense the overflow from the radiator 7 reaching the condenser 11 by way of the pipe 6. Thus, the overflow is saved and condensed and then returned to the cooling system by way of the outlet chamber 18, the pipe 12 and the ball check valve 21, leading to one of the water chambers of the cooling system provided in the jacket 9 of the motor vehicle cylinder. This arrangement also serves to reduce to the minimum any objectionable odors from the overflowing of the radiator 7, particularly when alcohol or the like has been supplied to the radiator 7.

As the construction of the device has thus been described in detail, brief reference is now had to its use and modus operandi: All overflow from the radiator 7, as when the same is overheated and the contents thereof is boiling, will rise in the pipe 6 and pass into the condenser 11 at one end thereof preferably at an upper corner of the condenser 11. This overflow will circulate through the several coils 11a of the condenser 11 and cool and condense therein and then return from the lower corner of the condenser 11 at the other end thereof, by way of the outlet chamber 18 and the return pipe 12, pass the ball check valve 21, to the engine jacket 9 in a cool liquid form. Thus, the overflow of the radiator 7 is automatically taken care of and escape of objectionable odors or gases from the radiator 7 during overflow thereof is substantially eliminated as the entire overflow passes through the pipe 6, from the fuel condenser 11 and the return pipe 12. The mounting of the flattened coil condenser 11 on the rearwardly inclined visor 15 with the flattened coils 11a of the condenser spaced apart and firmly supported in the slots 17 of the bracket plates 13, the entire outer surface of the condenser 11 is exposed to provide for the circulation of cool air around all of the coils 11a and every part of the condenser 11.

From the foregoing description taken in connection with the accompanying drawings, it will be manifest that a cooling system for a motor vehicle is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limitative or restrictive sense.

Having thus described my invention, what I claim as new and desire to secure by Letters Patent is:—

1. A cooling system for a motor vehicle engine including a condenser having elongated flattened coils arranged in an inclined plane with all of the coils tilted rearwardly; spaced angularly slotted brackets for carrying said flattened coils; a pipe leading from the engine radiator to one end of said condenser; means for supporting said condenser in an inclined plane outwardly of the motor vehicle body; an outlet chamber at the other end of said condenser; a turned upstanding open vent carried by said outlet chamber; and a valved return pipe from said outlet chamber, to the engine jacket.

2. A cooling system for a motor vehicle engine including a condenser having elongated flattened coils arranged in rearwardly tilted spaced parallel position; a plurality of bracket plates for supporting said condenser in a rearwardly inclined position, said bracket plates having inclined slots in upstanding portions to accommodate said coils of the condenser; said bracket plates having oppositely extended lugs at their lower edge for attachment to the upper face of the visor over the wind shield of the motor vehicle; a feed pipe for said condenser rising from the radiator of the engine to the upper corner of one end of said condenser; and a return from the lower corner of the other end of said condenser to the jacket of the engine.

HAROLD MEADOWS. [L. S.]